Oct. 26, 1965 E. F. WARNKE 3,214,178

RECORD CARRIER

Filed Sept. 26, 1960

Inventor:
Egon Fred Warnke
by: George H. Spencer
Attorney

United States Patent Office 3,214,178

Patented Oct. 26, 1965

3,214,178
RECORD CARRIER

Egon Fred Warnke, Hannover, Germany, assignor to Telefunken Aktiengesellschaft, Berlin-Charlottenburg, Germany Filed Sept. 26, 1960, Ser. No. 58,334
Claims priority, application Germany, Oct. 1, 1959, T 17,288
5 Claims. (Cl. 274—41.4)

The present invention relates to a magnetic record carrier and to a method of making the same.

There exist magnetic recording apparatus, particularly apparatus adapted for dictating purposes, which instead of tape use sheet-type record carriers in the form of discs or belts. In such record carriers, the surface provided with the magnetic layer contains a guide groove of constant pitch in which the pole shoes of the magnetic head are moved from the periphery to the center of the disc-type carrier, or from one end of a belt-type carrier to the other. As is customary with phonograph records, the groove commences with a running-in or starting portion which has a pitch greater than that of the remainder of the groove, thereby facilitating the starting of the recording and playback operations.

Experience has shown that a person using the apparatus will often start to dictate as soon as the recording head is placed on the record carrier. If this occurs after the recording head has been put at a place somewhere in the arcuate region between the beginning of the starting portion of the groove and the point at which the starting portion is closest to the remainder of the groove, and if at this place the recording head is radially exterior of the starting portion, then upon attempted playback the record carrier will very probably be in an initial position relative to the carrier such that the pole shoes will not pass over the beginning of the recorded portion. Consequently, the person transcribing the material dictated into the recorder will miss the beginning and be forced to experiment until he has placed the record carrier in a position where he will be able to hear the very beginning of the dictation.

The above disadvantage could be avoided if the person dictating into the recorder could be persuaded to wait a few seconds before speaking, but, human nature being what it is, this has not been found to be a practical solution.

It is, therefore, an object of the present invention to remedy this situation, and, with this object in view, the present invention resides mainly in a record carrier usable with a magnetic recording apparatus, which carrier is formed with an appropriately positioned permanent sound marker. This sound marker causes an audible signal to be produced which will indicate to the user that he may now commence dictating.

The present invention also resides in a method of making such a record carrier, this method consisting essentially of the step of pressing the marker into the carrier simultaneously with the pressing of the entire carrier.

Additional objects and advantages of the present invention will become apparent upon consideration of the following description when taken in conjunction with the accompanying drawings in which.

Figure 1:
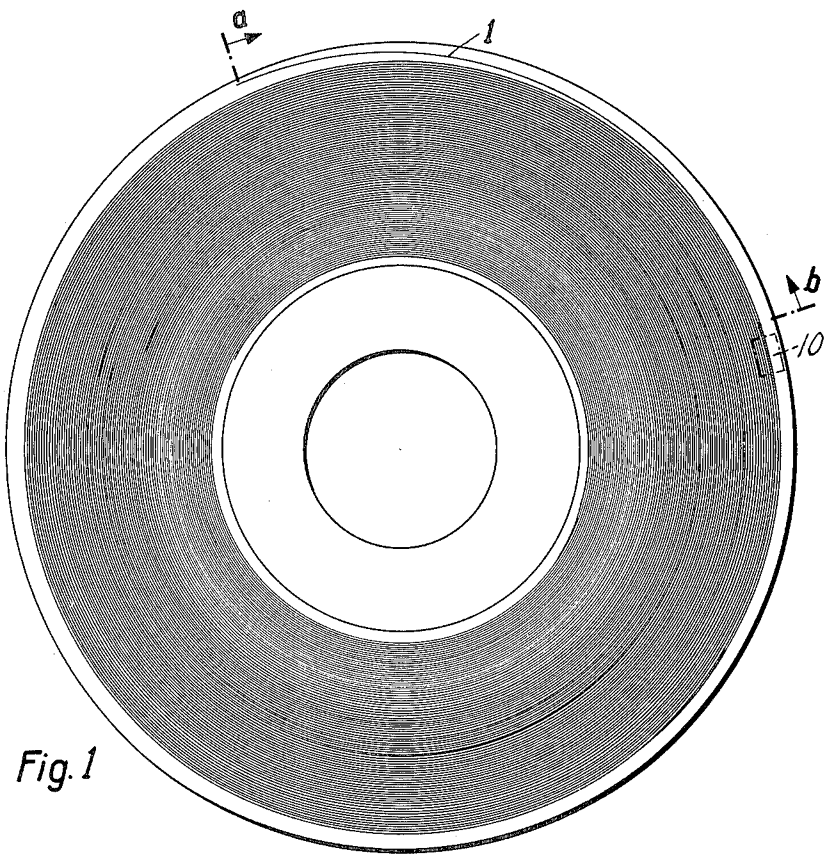
FIGURE 1 shows a disc-type record carrier according to the present invention.

Referring now to the drawings, FIGURE 1 shows a disc-type record carrier in which the recording groove instead of being formed by depressing the surface, as is the case in phonograph records, is formed by pressing on a raised spiral web 1 which is applied during the manufacture of the record carrier. The web starts near the periphery of the disc with a starting portion having a pitch greater than that of the remainder of the web, which then spirals inwardly toward the center of the disc with a constant pitch. The starting portion extends throughout an arc of about 90°, as is indicated in FIGURE 1 by lines *a* and *b*.

As mentioned above, if the user starts dictating as soon as the recording head shown schematically in FIGURE 1 at 10 is placed on the carrier and this occurs exteriorly of the web 1 within the region defined by lines *a* and *b*, and if upon playback the disc occupies such an initial position that the pole shoes of the reproducing head pass between the inside of the starting portion of the web 1 and the next inner convolution when the point *a* of the record carrier moves past the head, then part of the dictation will not be heard, and it is this which makes it necessary for the transcriber to replace the disc so that he will be able to hear everything that was dictated.

Figure 2:
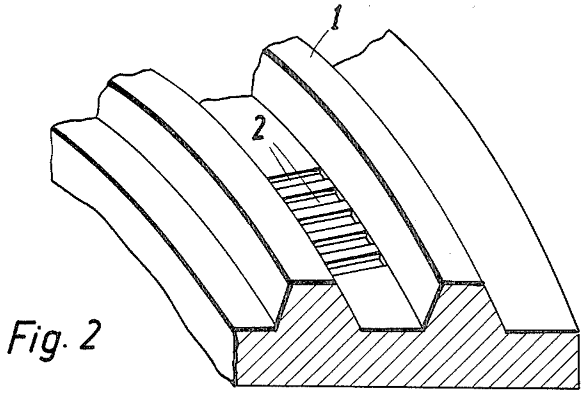
FIGURE 2 is a sectional perspective view, on an enlarged scale, of a portion of a record carrier according to the instant invention.

This disadvantage is avoided by forming the record carrier with a sound marker which is located approximately at that point at which the starting portion of the groove is closest to the remainder of the groove. The sound marker is constituted by a series of spaced recesses 2, shown in FIGURE 2, which extend transversely to the direction of the groove. The arrangement of the recesses is such that when the record carrier, from which previous recordings are erased by a constant, i.e., a D.C. field, is scanned, an audio voltage will be induced in the reproducing head of the recording apparatus when this reproducing head passes over the series of recesses, this audio voltage producing a sound which serves as the marker for indicating that recording may be commenced.

Thus, all that the person starting to use the apparatus need do, is to switch the recorder to "Playback" position until he hears the signal, whereafter he may switch to "Record" position and commence to dictate.

It will be appreciated that thanks to the present invention, the dictation will not start until the recording head is in a position which will make it possible for the person transcribing the recording to hear all the dictation without having to be especially careful in selecting the starting point of such dictation. This advantageous result is achieved without requiring any component parts not already provided in virtually all recording apparatus, it being essential only that the recording apparatus be equipped with a permanent magnet erasing head which erases at the beginning of the dictation, because only then will the change in magnetization, resulting from the passing of the playback head over the series of recesses cause a voltage to be induced in the playback head. This, however, is no problem because such erasing heads are universally used in dictating machines using sheet-type record carriers, such as discs or belts. Nor do any manufacturing problems arise, inasmuch as the spaced recesses in a record carrier according to the present invention can readily be pressed simultaneously with the pressing of the entire carrier, there being no appreciable additional costs involved.

If desired, a series of marker recesses may be provided elsewhere on the record, as, for example, at the end or at a point which will indicate that the end of the recording groove will be reached within a given period of time.

The following is an illustrative example of a record having the recesses providing the marker signal. The recesses are of approximately rectangular cross section and are spaced equidistantly from each other. The width of each recess, in the direction of the groove, is about 37 microns (1 micron=$10^{-3}$ mm.), and adjacent recesses are spaced about 37 microns from each other. If the record carrier is rotated at such a speed that the groove portion formed with the recesses will move past the reproducing head at a speed of about 7.3 cm./second, the voltage induced in the reproducing head will have a frequency of about 1,000 cycles per second. This frequency is well suited due to the frequency response characteristics of the reproducing heads of most magnetic recording apparatus.

It has been found that a signal duration of about 0.2 seconds is adequate, so that with the recesses being dimensioned and spaced as indicated above, there will be approximately 200 such recesses.

Figure 3:
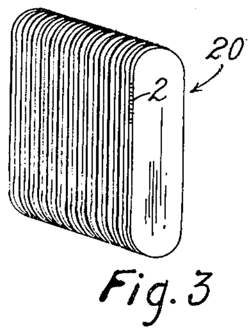
FIGURE 3 shows, in perspective, a belt-type record carrier according to the present invention.

FIGURE 3 shows the present invention incorporated in a belt-type carrier 20, the grooves 2 being located near an edge.

It will be understood that the above description of the present invention is susceptible to various modifications, changes and adaptations, and the same are intended to be comprehended within the meaning and range of equivalents of the appended claims.

I claim:

1. A sheet-type magnetic record carrier for use with magnetic recording apparatus having a reproducing head, said carrier having a magnetic layer and being provided with a recording groove commencing with a starting portion of a pitch different from that of the remainder of the groove, the bottom of said starting portion being formed, at least at the point at which said starting portion is closest to the remainder of said groove, with a series of recesses transverse to the direction of said groove, said recesses having a width which is generally of the same order of magnitude as the distance which consecutive recesses are spaced from each other to provide an air gap means of varying size for inducing an audio voltage in the reproducing head of the recording apparatus when, after a preceding erasing of said record carrier by a D.C. field, such head scans said starting portion, said audio voltage being suited for producing an audio signal.

2. A record carrier as defined in claim 1 wherein said recesses are spaced from each other such a distance that when said portion of said groove formed with said recesses is moved at a predetermined speed, the frequency of said audio voltage is approximately 1,000 cycles per second.

3. A record carrier as defined in claim 2, wherein said recesses have in the direction of said groove a width of about 37 microns and are spaced about 37 microns from each other, whereby when said carrier is used with recording apparatus which moves said portion of said groove formed with said recesses at a speed of about 7.3 cm./second, there will be induced in the reproducing head of such apparatus said audio voltage having said frequency of approximately 1,000 cycles per second.

4. A record carrier as defined in claim 1, said carrier being in the form of a disc.

5. A record carrier as defined in claim 1, said carrier being in the form of a belt.

References Cited by the Examiner

UNITED STATES PATENTS

| | | | |
|---|---|---|---|
| 956,727 | 5/10 | Osborn | 274—42 |
| 1,372,822 | 3/21 | Myer | 274—42 |
| 2,428,946 | 10/47 | Somers | 178—69.5 |
| 2,493,755 | 1/50 | Ferrill | 274—41.4 |
| 2,551,198 | 5/51 | Barrett | 274—4 |
| 2,658,762 | 11/53 | Begun | 274—4.1 |
| 2,670,212 | 2/54 | Heller et al. | 274—4 |
| 2,797,402 | 6/57 | Duffey et al. | 179—100.2 |
| 2,914,756 | 11/59 | Heidenhain et al. | 179—100.2 |
| 3,024,321 | 3/62 | Davis | 274—4.1 |

FOREIGN PATENTS

| | | |
|---|---|---|
| 130,505 | 12/48 | Australia. |
| 553,132 | 2/58 | Canada. |

OTHER REFERENCES

Steward, Magnetic Recording Techniques, N.Y., McGraw-Hill Book Co., Inc., 1958, pages 93–95.

NORTON ANSHER, *Primary Examiner.*

NEWTON LOVEWELL, E. J. SAX, *Examiners.*